United States Patent [19]

Schaerer

[11] 4,144,111

[45] Mar. 13, 1979

[54] METHOD FOR MANUFACTURING A RESISTANT PLASTIC PIPE

[76] Inventor: André J. Schaerer, Saengglenstrasse 22, 8122 Pfaffhausen, Switzerland

[21] Appl. No.: 705,673

[22] Filed: Jul. 15, 1976

[30] Foreign Application Priority Data

Aug. 2, 1975 [DE] Fed. Rep. of Germany ....... 2534635

[51] Int. Cl.$^2$ ............................................ B29C 19/00
[52] U.S. Cl. ................................ 156/187; 156/244.14; 156/285; 264/515; 264/173; 264/209
[58] Field of Search .............. 156/244, 184, 500, 149, 156/187, 244.14, 244.13, 244.24, 143–144; 264/209, 95, 230, 94, 99, 100, 98, 173; 138/127, 144, 143, 173

[56] References Cited

U.S. PATENT DOCUMENTS

| | | | |
|---|---|---|---|
| 3,296,344 | 1/1967 | Timmerman | 264/209 X |
| 3,414,448 | 12/1968 | Harpfer | 156/149 |
| 3,547,162 | 12/1970 | Schaerer | 156/149 X |
| 3,586,558 | 6/1971 | Galloway | 156/149 |
| 3,787,552 | 1/1974 | Spencer et al. | 264/209 X |
| 3,872,893 | 3/1975 | Roberts | 264/209 X |
| 3,939,243 | 2/1976 | Dawson | 264/209 X |
| 3,988,188 | 10/1976 | Johansen | 138/144 X |

FOREIGN PATENT DOCUMENTS 647433 8/1962 Canada.
434716 10/1967 Switzerland.

*Primary Examiner*—David A. Simmons
*Attorney, Agent, or Firm*—Webb, Burden, Robinson & Webb

[57] ABSTRACT

The method of manufacturing a composite pipe includes extruding an inner pipe from a polyethylene or polyethylene copolymer mix having a cross-linking agent such as peroxide homogeneously dispersed therein. The extrusion takes place below the decomposition temperature of the agent to prevent cross-linking. Thereafter, an outer jacket is positioned over the inner pipe and the composite pipe is heat treated, usually in coil form, at a temperature to cause cross-linking of the inner pipe. A positive gas pressure is maintained in the pipe during heat treating at least until the cross-linking has progressed sufficiently to prevent the pipe from collapsing. The outer jacket acts as the reinforcement and maintains the shape and inside diameter of the inner pipe during processing under pressure.

23 Claims, No Drawings

METHOD FOR MANUFACTURING A RESISTANT PLASTIC PIPE

FIELD OF THE INVENTION

The invention relates to a method for manufacturing a composite pipe which is resistant to hot and corrosive fluids and is well suited for sanitary installations in buildings, consisting of an inner pipe of cross-linked polyethylene or polyethylene copolymer which is cross-linked after extrusion and an outer jacket.

DESCRIPTION OF THE PRIOR ART

Plastic pipes which have an inner liner made of cross-linked polyolefin or an olefinic copolymer, as for instance polyethylene, and an outer jacket and whose inner line is intended to be in contact with hot water have been disclosed in Swiss patent PS No. 434 716. Such plastic pipes offer quite a number of advantages over conventional pipes made of copper or zinc coated steel for conveying hot or cold water for sanitary installations and heating installations in housing. Such advantages include their corrosion resistance, thermal insulation, low price, freedom of odor and taste, aging properties, absence of toxic effects, freedom from metal ions, and easy installation without soldering or welding of attachments. Of great importance is the complete absence of stress cracking of the cross-linked polyethylene liner when under pressure with hot water as compared to normal polyethylene.

Up to now there is no economical or suitable process known for manufacturing such a cross-linked pipe, though its many advantages are eminent. The normal and well known extrusion methods as used for the manufacturing of polyethylene pipes are not applicable. When extruding a polyethylene pipe which contains a cross-linking agent such as an organic peroxide to obtain a cross-linking reaction in the properly heated extrusion die, one observes scorching on the outside of the pipe which comes into close contact with the heated die.

The initial cross-linking of the polyethylene at the outside of the pipe causes a partial increase of the viscosity of the melt flow adjacent to the wall so that the melt flow gets disturbed in such a way as to prevent a normal extrusion procedure.

It is also not possible to extrude a peroxide containing polyethylene in the usual way at a temperature low enough to prevent any cross-linking reaction and then have the pipe subsequently cross-linked because when the peroxide containing polyethylene pipe reaches its melt temperature it has no strength and, therefore, collapses before reaching the temperature range in which a cross-linking reaction takes place. There have been attempts to overcome this difficulty by adding up to 60% by weight of carbon black so as to keep the extruded pipe in shape when reaching the melting temperature of polyethylene and subsequently the cross-linking temperature. However, due to the high carbon black content only rigid pipes can be manufactured which cannot be coiled or bent.

SUMMARY OF THE INVENTION

The present invention describes a process which overcomes these difficulties and which enables an economical and uncomplicated manufacture of a hot water and pressure resistant flexible plastic pipe.

The method of manufacturing a composite pipe includes extruding an inner pipe from a polyethylene or a polyethylene copolymer mix having a cross-linking agent such as peroxide homogeneously dispersed therein. The extrusion takes place below the decomposition temperature of the agent to prevent cross-linking. Thereafter, an outer jacket is positioned over the inner pipe and the composite pipe is heat treated, usually in coil form, at a temperature to cause cross-linking of the inner pipe. A positive gas pressure is maintained in the pipe during heat treating at least until the cross-linking has progressed sufficiently to prevent the pipe from collapsing. The outer jacket acts as the reinforcement and maintains the shape and inside diameter of the inner pipe during processing under pressure.

DESCRIPTION OF THE PREFERRED EMBODIMENTS

The process consists of first extruding the peroxide containing pipe, then applying a jacket thereto and finally submitting the composite pipe to a thermal treatment in such a way as to achieve a cross-linking reaction of the pipe while a gas pressure is maintained inside the pipe at least during the first part of the cross-linking reaction.

The jacket, which is applied over the peroxide containing pipe before the cross-linking reaction takes place, permits gas pressure to be maintained inside of the pipe without enlarging its diameter during the subsequent heat treatment. On the other hand, the gas pressure prevents the collapse of the pipe during the heat treatment in the first critical temperature range when the temperature is raised over the melting point of the polyethylene pipe. All of this is achieved without the use of a mandrel. By this simple measure the round shape of the polyethylene pipe is maintained during the cross-linking reaction. Cross-linked pipes which have been made by this method show a glossy and smooth inner surface which prevents the deposition of encrustations and calcium deposits which would reduce the flow rate in the pipe. The jacket or reinforcing sheath which surrounds the polyethylene pipe takes up the pressure during the heat treatment and shows a complete adherence to the polyethylene pipe after the cross-linking reaction has taken place so that a two layer composite pipe is formed. The jacket furthermore acts as a significant reinforcement of the pipe so that it possesses not only the required temperature resistance for carrying hot water but it is also capable to take up considerable pressures at elevated working temperatures.

Depending upon the kind of jacketing and the diameter of the pipe a bursting strength of 40 $kg/cm^2$ (568 lbs./sq. inch) at a working temperature of 70° C. is obtainable. This offers a security factor of 10 compared to the normal working pressure in sanitary installations in housing.

A general example of my process is as follows. A low density polyethylene (LDPE) with a melt index of 0.1 to 5 which contains an organic peroxide homogeneously dispersed therein and which has a decomposition temperature higher than 135° C. is extruded into a pipe at a temperature below the decomposition temperature of the peroxide. The extrusion process can be carried out even when the temperature of the molten polyethylene is only a few degrees centigrade lower than the decomposition temperature of the organic peroxide and partial cross-linking and scorching will be prevented. However, it is desirable to use a peroxide with a decomposition temperature higher than 135° C. in order to assure no cross-linking will occur during the extrusion process.

It is a preferred method to carry out the subsequent heat treatment at a temperature range of 135° C. to 200° C., preferably between 135° and 180° C. for a duration of 0.5 to 7 hours. The higher the cross-linking temperature, the shorter the cross-linking time. It has been found that a complete cross-linking can be achieved at a relatively low temperature in the range of 135° to 140° C. provided the dwell time is extended to seven hours. Under such conditions it is possible to choose as a reinforcing jacket a polypropylene or another thermoplastic material with a high melting point which will not lose its shape at this cross-linking temperature and inside pressure.

The heat treatment of the composite pipe is carried out in such a way as to have the pipe coiled up and to roll the coil into an oven where the heat treatment takes place. The flexible nature of the composite pipe allows it to be coiled without deformation of its round cross-section, even when using coils of great length and diameter.

An integral part of this invention is to apply a positive air pressure of 0.2 to 2 kg/cm$^2$ during the heat treatment. It has been found that such a pressure is sufficient to prevent the polyethylene pipe from collapsing as the temperature passes through the melting point of the polyethylene and increases until the beginning of cross-linking with its associated increase in viscosity. It is not necessary that the pressure inside of the pipe be maintained during the complete heat treatment process. It is sufficient to maintain the pressure for a period of time until the cross-linking reaction has progressed to a degree where the increased viscosity prevents the polyethylene pipe from collapsing. It goes without saying that there are no objections to having the pressure applied over the complete duration of the heat treatment.

For the application of the jacket, one can choose according to this invention different materials and working methods. In order to obtain a very flexible composite pipe it is recommended to have the jacket applied over the polyethylene pipe by the extrusion method, using a temperature resistant thermoplastic material such as polypropylene, polyamide, polycarbonate, ethylene-propylene-copolymer, ethylene-butadienestyrene-terpolymer or an elastomer of polyester-isocyanate. The wall thickness of the jacket must be adapted to the working pressure of the pipe which usually is in the range of 50–60 lbs./sq. inch. In some applications the composite pipe is installed in concrete, which offers additional protection for the pipe, takes up at least part of the pressure load on the pipe and provides a limit to the creep of the pipe.

An alternative method for jacketing the inner pipe consists of applying to it a reinforcement of braiding, or wrapping it with strips of paper or fibers such as glass fibers, synthetic fibers, viscose fibers or cellulosic fibers. A reinforcement with such materials increases the bursting strength of said polyethylene pipe and serves as a mechanical protection. It is also possible to have the braided or taped jacket covered by a thin sheath of plastic as for instance nylon or polypropylene, which are preferably extruded.

Another modification of the invention consists in applying a thermoreactive resin in the form of a solution with which the tape is impregnated. The tape can be impregnated with the thermoreactive resin before or during the winding or braiding operation.

When the pipe substantially is submitted to the heat treatment, the cross-linking of the polyethylene takes place and at the same time the thermoreactive resin hardens and increases the strength of the jacket. Cellulosic fiber tapes such as kraft paper tapes impregnated with phenolic-, epoxy- or polyester-resins and wound around the polyethylene pipe form a very compression resistant jacket after the heat treatment.

An increase in the flexibility of the jacket is obtained by giving the jacket a corrugated shape with methods well known in the art of manufacturing flexible pipe. If a pipe is required with a specially high burst strength, a corrugated metallic tape can be wound around the polyethylene pipe, such as for instance a lead coated steel tape. Such a composite pipe shows a high bursting strength and good corrosion resistance.

It is also possible to use a metallic pipe which fits tightly around the polyethylene pipe and which is drawn thereover. Welded or drawn aluminum-, copper- or steel pipe can be drawn over the polyethylene pipe. In the case of pure aluminum, the pipe can also be extruded over the polyethylene pipe. For manufacturing composite pipe of predetermined length, it is advisable to apply a thin walled metallic pipe over the polyethylene pipe in a length of approximately 18 to 60 feet length so that the composite pipe can be cold bent and coiled for the subsequent heat treatment.

Composite pipes made according to this invention can be applied not only for housing installations but also can be installed as conduits for gas or corrosive liquids in industry replacing rubber lined pipes.

When choosing a metallic pipe as an outer jacket, it is advisable to apply said pipe over the prestretched polyethylene pipe. After releasing the tension, the polyethylene pipe fits tightly to the inner wall of the metallic pipe. The inner wall of the metallic pipe is preferably degreased in order to obtain perfect adhesion to the polyethylene pipe after the heat treatment.

If for instance polypropylene is chosen as a jacket for the polyethylene pipe and dicumyl-peroxide is used as the cross-linking agent, a reaction temperature of 135° C. and a curing time of six hours is necessary to achieve complete cross-linking. However, if a jacket of thermoreactive resin impregnated kraft paper tape is applied over the polyethylene pipe, the cross-linking of the polyethylene pipe and simultaneously the curing of the impregnated tape can be carried out at a temperature of 160° C. within 2 to 3 hours.

To increase the thermal insulation of said composite pipe, a further sheath of foamed plastic can be applied. Such a foamed sheath does not necessarily adhere to the outer surface of the composite pipe. This enables free dilation of said pipe when embedded in concrete. In such an application it is advisable to apply as a reinforcement a braided glass fiber jacket over which a foamed polymer such as a foamed polyethylene sheath is extruded which results in a flexible insulated pipe.

The pipe even without a foamed sheath shows very good thermal insulation properties due to the low thermal conductivity of the cross-linked polyethylene in the order of 0.22 k cal/h $\times$ m $\times$ ° C. at 80° C. The pipe is so flexible that it may be rolled out between the steel girders of a concrete floor or wall and subsequently embedded in the cast concrete. Such an installation method saves cost and labor. The pipe can also be installed in precut slots in a brick wall and covered up with mortar. The pipe can also be used for cold water or other mediums at elevated temperatures.

The mechanism of the cross-linking reaction of polyethylene is well known. The three dimensional linkage of polyethylene takes place by direct connection of radicals which are produced by the influence of suitable organic peroxides, preferably at tertiary carbon atoms, i.e. at the site of side branches of the linear structure of polyethylene. The basic reaction of radical building is a dehydrogenation, whereby the hydrogen of tertiary carbon atoms is transferred to the oxy-radicals of the peroxide. The peroxide decomposition products form volatile products which evaporate from the polyethylene by the reaction temperature. With the beginning of cross-linkage, an increase of viscosity and decrease of solubility in organic solvents is observed. Both properties are a measure for the degree of cross-linking. At maximum cross-linking, the polyethylene loses its tendency for stress cracking which makes it especially suitable for hot water lines and chemical lines.

Since both the cross-linking temperature and cross-linking time can be determined, the optimum conditions can be chosen to obtain the maximum degree of cross-linking. The simplest method to determine the degree of cross-linking consists in measuring the gel-content, i.e. the insoluble part in cross-linked polyethylene. A quantity of 0.3 grams of cross-linked polyethylene in the form of fine particles is subjected during 6 hours to extraction with toluene, xylene or decolin and, after careful drying, weighed. The difference in weight corresponds to the extracted gel from noncross-linked polyethylene and is indirectly proportional to the cross-linking degree.

A simpler method which can be carried out during production consists in cutting thin slices from the pipe made from carbon black pigmented resin and adding those to boiling toluene. If the boiling toluene stays water clear for at least 15 minutes, the cross-linking has reached a level of over 65%.

For the cross-linking operation a number of organic peroxides are suitable. These include benzoylperoxide; lauroylperoxide; tertiarybutylperbenzoate; 2,5-dimethyl-2,5-di-tertiarybutylperoxy-hexin-3; 2,5-dimethyl-2,5 di(t-butyl peroxy)hexane, dicumyl peroxide with a content of 40% peroxide and 60% filler and a half life value of 60 seconds at 180° C.; 1,3-bis(tert-butyl-peroxy-diisopropyl)benzene with a half life at 180° C. of 90 secons; di-tert-butyl peroxide with a half life at 180° C. of 180 seconds.

The process according to the invention is described hereinafter with some examples.

EXAMPLE 1

30 kg of a low density polyethylene resin commercially available under the designation Lupolen 1852 E and manufactured by Badische Anilin and Sodafabrik in Ludwigshafen (BASF) Federal Republic of Germany, having a melt index of 0.4 to 0.6, a density of 0.93 and a carbon black content of 2.5 percent of weight showing a pellet size of 3 mm. were charged in a dry mixer Type Henschel of Rheinstahl AG. and mixed with 600 grams of 2,5-dimethyl-2,5 di(t-butyl peroxy)hexane. The temperature was raised by the mixing action to 60° C. at which point the mixing was interrupted. The peroxide had practically completely been absorbed at this temperature by the polyethylene pellets. The pellets were left to cool to room temperature and were subsequently charged into the hopper of an extruder type B 45 manufactured by Messrs. Kuhne GmbH, Siegburg, Germany, with a ratio of screw length to diameter of 20:1 and a 45 mm. screw with a metering zone for polyethylene extrusion. A pipe of 12 mm. inner and 16 mm. outer diameter was extruded at a material temperature of 130° C. and a production rate of 3 meters/minute and wound on a barrel.

The pipe obtained was subsequently reinforced by winding a lead coated steel tape of 0.12 mm. thickness and 20 mm. width on a winding machine built by Pilca AG., Ruschlikon, Switzerland, around the pipe whereby the tape was corrugated during the winding operation. The flexible composite pipe was wound on a cable drum which was rolled into a heating chamber and subjected to a temperature of 180° C. for 2 hours. An internal pressure was maintained at 1.8 kg/cm$^2$. After cooling the pipe the degree of cross-linking was measured as follows: Small pieces of the cross-linked polyethylene pipe were added to boiling toluene. After 15 minutes the boiling toluene was still water clear which proved that no polyethylene had gone into solution. Furthermore, the pipe was filled with water having a temperature of 70° C. and kept at this temperature and submitted to a pressure of 25 kg/cm$^2$ for 10 days. This pressure corresponds to a security factor of 6 when compared to hot water pipe installations in housing. No failure was observed. Ten specimens were cut out of the pipe and submitted to the stress cracking test according to ASTM D 1693 60 T without one single failure.

EXAMPLE 2

A copolymer of ethylene-vinyl acetate (Lupolen V 3510 K by BASF) with a melt index of 3.4–4.6 and a density of 0.934 with 2% carbon black was charged to a dry mixer and 2% by weight of 1,3 bis(tert-butyl peroxy diisopropyl)benzene was added and mixed according to Example 1. The peroxide containing copolymer was extruded into a pipe of 12 mm. inner diameter and 16 mm. outer diameter at a material temperature of 135° C. Extrusion speed was maintained at 30 feet/min. and the cooled pipe was wound on a cable drum. 20 mm. wide glass fiber tape with a weight of 150 g/m$^2$ was wrapped around the pipe under a tension of 2 kg. The reinforced pipe was subjected to a temperature of 160° C. during 4 hours at an inner pressure of 1 kg/cm$^2$. After cooling, the pipe was jacketed by extrusion with a sheath of 1 mm. thick foamed polyethylene, which resulted in a composite pipe with good flexibility. After embedding this pipe in concrete, perfect dilation of the composite pipe in the foamed sheath could be observed when changing from cold to hot water. Attempts to destroy the pipe by bursting failed demonstrating the high bursting limit.

EXAMPLE 3

A cross-linked polyethylene pipe made according to the description in Example 1 and having an inner diameter of 12 mm. and an outer diameter of 15.9 mm. was set under longitudinal stress of 30 kg and introduced into a thin walled aluminum pipe of 16 mm. inner diameter and 18 mm. outer diameter. The longitudinal stress which was applied to the polyethylene pipe reduced its diameter to such an extent as to facilitate the introduction into the aluminum pipe. After relieving the stress the polyethylene pipe regained its orginal diameter and fit tightly to the inner wall of the aluminum pipe. The composite pipe was coiled and subjected to a temperature of 160° C. for 4 hours under an internal pressure of 1.5 kg/cm².

The composite pipe made by this method was light, had excellent corrosion resistance, and good mechanical properties, the bursting strength being higher than 50 kg/cm² at a temperature of 70° C. It could be bent by hand. The radicals produced during the cross-linking reaction created a very good bond between the polyethylene and the aluminum. At a temperature of 120° C. and a vacuum of 10 mm. Hg applied to the pipe, no collapse of the cross-linked polyethylene occurred. The same result was obtained when using a pipe manufactured according to Example 2. Further tests using a steel pipe instead of an aluminum pipe gave the same satisfactory result. The steel pipe, however, was more difficult to bend by hand.

Instead of polyethylene and the beforementioned copolymers other hydrocarbon copolymers can be used for manufacturing the pipe, though they are more costly. For instance, a copolymer of ethylene-propylene or ethylene-ethylacrylate can be used which will increase the flexibility of the pipe. Using a copolymer with a melt index greater than 3 the extrusion rate can be increased up to 10 meters per minute as there is practically no increase of frictional heat and the mass temperature can be kept at 130° C.

It is preferable to use a low content of filler such as carbon black, preferably 2 to 3%, in the extrusion batch of polyethylene because the carbon black is a good indicator for establishing the cross-linking percentage and furthermore the carbon black acts as a heat stabilizer and UV-light absorber. However, if flexibility is not a requirement higher amounts of carbon black may be used. Commercially available polyethylene compounds such as recommended for water pipes with a melt index of 0.3 to 3 and a carbon black content of 2% are recommended.

I claim:

1. A method of manufacturing a composite pipe comprising:
    A. extruding an inner pipe from a polyethylene or polyethylene copolymer mix at a temperature below which cross-linking takes place;
    B. positioning a reinforcing jacket over the inner pipe to form a composite pipe; and
    C. heat treating the composite pipe at a temperature to cause cross-linking of the inner pipe portion and adherence of the inner pipe portion to the reinforcing jacket while maintaining a positive gas pressure inside the composite pipe during at least a first phase of the heat treating when cross-linking is initiated.

2. The method of claim 1, said mix including a cross-linking agent homogeneously dispersed therein, said extrusion temperature being less than the decomposition temperature of said agent.

3. The method of claim 2, said cross-linking agent being an organic peroxide.

4. The method of claim 3, said polyethylene or polyethylene copolymer being in granular form, having a low density and a melt index of 0.1 to 5 and said peroxide having a decomposition temperature greater than 135° C.

5. The method of claim 4, said heat treating temperature range being 135° C. to 200° C.

6. The method of claim 5, said range being 135° C. to 180° C. for a duration of 0.5 to 7 hours.

7. The method of claim 2 including the step of coiling the composite pipe into coil form prior to heat treating.

8. The method of claim 2, said positive air pressure being from 0.2 to 2 kg/cm².

9. The method of claim 8 including maintaining said air pressure until cross-linking has progressed sufficiently to prevent the composite pipe from collapsing.

10. The method of claim 2, said reinforcing jacket selected from a group consisting of polypropylene, polyamide, polycarbonate, ethylene-propylene copolymer, ethylene-butadiene styrene terpolymer and a polyester-isocyanate elastomer.

11. The method of claim 2 including forming the reinforcing jacket by wrapping the inner pipe with fibrous strips.

12. The method of claim 11 including covering the reinforcing jacket with a thin sheath of plastic.

13. The method of claim 2, said jacket being a thin walled metallic pipe.

14. The method of claim 13 including prestretching said inner pipe under tension prior to positioning the reinforcing jacket thereover and releasing said tension thereafter so as to form a tight fit therebetween.

15. The method of claim 2, said jacket being polypropylene.

16. The method of claim 15, said agent being dicumylperoxide.

17. The method of claim 2 including extruding a foamed polyethylene sheath over the composite pipe.

18. The method of claim 2, said mix further including a filler capable of indicating the amount of cross-linking.

19. The method of claim 18, said filler being carbon black present in the amount of approximately 2% of said mix.

20. The method of claim 2, said reinforcing jacket being extruded onto the inner pipe.

21. A method of manufacturing a composite pipe comprising:
    A. extruding an inner pipe from a polyethylene or polyethylene copolymer mix at a temperature below which cross-linking takes place, said mix including a cross-linking agent homogeneously dispersed therein and said extrusion temperature being less than the decomposition temperature of said agent;
    B. positioning a reinforcing jacket over the inner pipe to form a composite pipe by wrapping the inner pipe with fibrous strip impregnated with a thermoreactive resin; and
    C. heat treating the composite pipe at a temperature to cause cross-linking of the inner pipe portion of the composite pipe and hardening of the resin while maintaining a positive gas pressure inside the composite pipe during at least a first phase of the heat treating when cross-linking is initiated.

22. The method of claim 21, said fibrous strip being cellulosic and said resin selected from the group consisting of a phenolic resin, epoxy resin and a polyester resin.

23. A method of manufacturing a composite pipe comprising:
    A. extruding an inner pipe from a polyethylene or polyethylene copolymer mix at a temperature below which cross-linking takes place, said mix including a cross-linking agent homogeneously dispersed therein and said extrusion temperature being less than the decomposition temperature of said agent;

B. positioning a reinforcing jacket formed of corrugated lead coated steel tape over the inner pipe to form a composite pipe; and
C. heat treating the composite pipe at a temperature to cause cross-linking of the inner pipe portion of the composite pipe while maintaining a positive gas pressure inside the composite pipe during at least a first phase of the heat treating when cross-linking is initiated.

* * * * *

UNITED STATES PATENT AND TRADEMARK OFFICE
CERTIFICATE OF CORRECTION

PATENT NO. : 4,144,111
DATED : March 13, 1979
INVENTOR(S) : Andre J. Schaerer

It is certified that error appears in the above-identified patent and that said Letters Patent are hereby corrected as shown below:

Column 4 Line 3 "substantially" should read --subsequently--.

Column 6 Line 10 "Pilca" should read --Plica--.

Signed and Sealed this

Twenty-second Day of May 1979

[SEAL]

Attest:

RUTH C. MASON
Attesting Officer

DONALD W. BANNER
Commissioner of Patents and Trademarks